United States Patent [19]

Schwarz

[11] Patent Number: 4,579,322
[45] Date of Patent: Apr. 1, 1986

[54] CABLE VISE

[76] Inventor: Edward L. Schwarz, 500 Cold Spring Rd., Rocky Hill, Conn. 06067

[21] Appl. No.: 652,520

[22] Filed: Sep. 20, 1984

Related U.S. Application Data

[63] Continuation of Ser. No. 522,003, Aug. 11, 1983, abandoned.

[51] Int. Cl.[4] ............................................. B23Q 3/00
[52] U.S. Cl. ...................................... 269/70; 269/221; 269/246; 269/274; 269/275; 269/296; 269/902
[58] Field of Search ............... 269/902, 274, 275, 246, 269/296, 221, 70

[56] References Cited

U.S. PATENT DOCUMENTS

| | | | |
|---|---|---|---|
| 960,916 | 6/1910 | Heiser | 269/296 |
| 2,519,107 | 8/1950 | Brown | 269/275 |
| 2,619,858 | 12/1952 | Starbuck et al. | 269/246 |
| 2,709,384 | 5/1955 | Harris | 269/296 |
| 3,602,492 | 8/1971 | Petrie | 269/296 |
| 4,005,945 | 2/1977 | Gutman | 269/902 |

*Primary Examiner*—Robert C. Watson
*Attorney, Agent, or Firm*—Robert S. Smith

[57] ABSTRACT

A workholding vise which comprises an elongated bottom plate and an elongated top plate. At least three legs are provided with structure for fixing the telescopic sections thereof in mutually fixed relationship. The apparatus includes structure for mounting the three legs at substantially equal distances from a common geometric axis of the structure for mounting. This structure for mounting allows pivotal motion with respect to the bottom plate. A first elongated jaw is mounted on the bottom plate. The first elongated jaw includes and elongated V-shaped open trough extending in the general direction of the elongation of the bottom plate and the first elongated jaw. The apparatus also includes a second elongated jaw also having an elongated V-shaped open trough in it. The apparatus includes structure for clamping the first and second jaws together.

2 Claims, 2 Drawing Figures

CABLE VISE

This application is a continuation of Ser. No. 522,003 filed Aug. 11, 1983, now abandoned.

BACKGROUND OF THE INVENTION

The invention relates to and particularly to tools for use by workman on large power cables.

Solid dielectric power cables used in the electrical and electrical utility industries have a rating of 600 V to 138 KV. These cables are used in underground or overhead primary or secondary electrical systems for service drops, distribution or transmission purposes. Such cables must be prepared to exacting standards for splicing, terminating and "tapping-in".

Improper procedures with less than the best workmanship by the person performing the cable preparation may result in an electrical outage, such as in a 25 KV or 35 KV distribution system, either almost immediately, or at some later date that would be costly to the utility company. More specifically, the cost may be as much as tens or even hundreds of thousands of dollars to locate, restore operations, and make restitution for the outage.

With cable preparation accuracy and workmanship quality being a critical factor, it is desirable to provide the best possible working conditions even if the work is to be performed in an underground vault, in a trench, at ground level, or in a bucket truck adjacent to an overhead line.

The cables typically have an outside diameter of $\frac{1}{2}''$ to $3\frac{3}{4}''$ with a conductor of either aluminum or copper in a size of #2 AWG to 2500 MCM, with between one and eight or more various insulation layers and shieldings over the conductor. Each must be measured and prepared to specific dimensions.

A crew of at least two, are presently required to prepare cables for splicing, terminating, tapping-in, or even cutting. One worker will hold a cable end as stationary as possible in a manner which provides maximum accessibility for the other worker. The other worker will then mark off measurements and perform the actual cable stripping, penciling, or cutting, as required by specifications.

On thick insulation cables, such as those used for the higher voltages, it is particularly difficult for both the cable holder and the cable preparer to perform their jobs. In many instances, it is impossible for two workers to be in the same working area due to space limitation. This situation requires one person to both hold and prepare the cable. Obviously, this increases the probability of bad workmanship. Thus, accuracy and quality workmanship are difficult to achieve under these circumstances.

Therefore it is desirable that a more satisfactory means for holding the cable be provided that may be used in a wide variety of working conditions and will allow one (or more) person(s) to conveniently, safely, and accurately prepare a cable.

An object of the invention is to provide a portable cable holding device capable of securing a heavy insulated power cable in a stationary and convenient manner to enable one (or more) worker(s) to easily, safely, and accurately, without damage to the cable, cut and prepare the cable for splicing, terminating, or tapping-in procedures, as are required in the electrical and electrical utility industries.

Another object of the invention is to permit a single worker to splice or terminate two cable ends.

SUMMARY OF THE INVENTION

It has now been found that these and other objects of the invention may be attained in a workholding vise which includes an elongated bottom plate and an elongated top plate. The apparatus also includes at least three telescopic legs, means for fixing the telescopic leg sections in mutually fixed relationship, and means for mounting the three legs at substantially equal distances from a common geometric axis of the means for mounting. The means for mounting allows pivotal motion with respect to the bottom plate. A first elongated jaw means is mounted on the bottom plate. The first elongated jaw means includes an elongated V-shaped open trough extending in the general direction of the elongation of the bottom plate and the first elongated jaw. A second elongated jaw means is mounted on the top plate. The second elongated jaw means includes an elongated V-shaped open trough extending in the direction of elongation of the top plate. The open V-shaped troughs in the first and second elongated jaws are disposed in generally registered relationship for cooperation with an associated cable. The apparatus also includes means for clamping the first and second jaws together.

In some forms of the invention the first and second elongated jaws may have at least a portion of the open V-shaped troughs manufactured of a rubber. The means for clamping may include a plurality of winged elements.

A single worker may splice or terminate the cable ends by using two cable vises in accordance with the invention for completing the splice or termination of the cables after they have been prepared. Each cable vises firmly secures a respective cable end, thus, allows one (or more) worker(s) to perform the total splice or termination.

BRIEF DESCRIPTION OF THE DRAWING

The invention will be better understood by reference to the accompanying drawing, in which.

DESCRIPTION OF THE PREFERRED EMBODIMENT

In underground systems, in splicing insulated power cables together, the cable ends are first prepared to exact specifications. Conductors in these opposing ends are joined together with a crimped or welded type metal connector. Then careful applications of layers of various insulating tapes are hand wrapped over the conductor union to fill in the void at the splice. When so prepared, the splice has electrical characteristics which are equal to or better than at any other point on the entire length of the cable.

Another and more popular method of splicing cables together is by using pre-fabricated molding splicing kits. These kits also require cable preparations to exactness, even more so than the hand-wrapped splice.

In underground systems, in terminating insulated power cables, the cable end is carefully prepared to exact specifications, as is required for splicing a cable. Then, the termination is installed. This requires that the cable be held in a rigid manner for convenient access by the worker.

Without the use of the cable vise(s), both splicing and terminating operations in underground systems require two or more workers to perform such operations, and in a less than ideal manner.

In overhead systems, for tapping-in on an insulated power cable as may be required at a point between the ends of a cable, or the termination of a cable, as in overhead distribution lines, the insulation at the "tap" or termination must be carefully removed from the conductor for a specific length without damage to the conductor beneath the insulation. Then a coupling or terminating device is attached to the conductor at the area where the insulation is stripped. In overhead systems, this operation is usually done from a "bucket" truck. The overhead cable is very flexible and can be difficult to prepare. However, using one cable vise in accordance with the invention, which may be straddled over the side of the bucket or positioned inside the bucket with extended legs, the cable can be clamped and held rigid in the cable vise, allowing the operator to safely and conveniently perform under ideal conditions.

Figure 1:
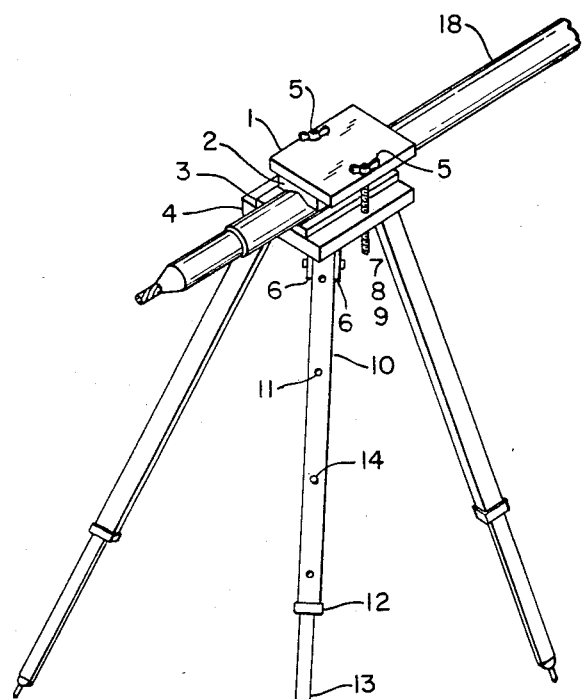
FIG. 1 is a perspective view of the cable vise in accordance with one form of the invention, showing it securing an insulated power cable within the clamp thereof.
Figure 2:
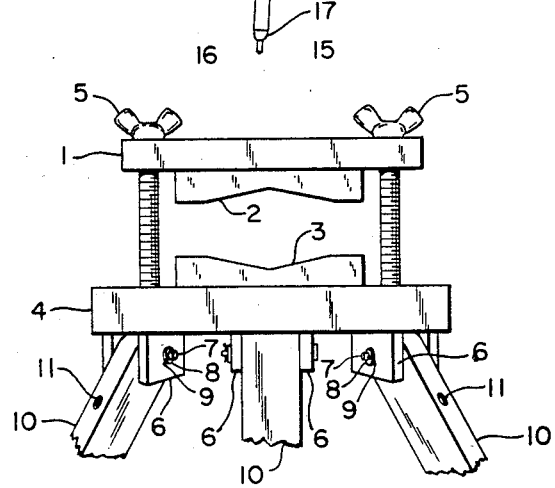
FIG. 2 is an enlarged front view of a portion of the apparatus illustrated in FIG. 1.

Referring now to FIGS. 1 and 2, the cable vise is a means to firmly grip and hold rigidly in place an insulated power cable 18 without causing any damage to the cable 18. The cable vise is a tripod-like device and comprises, in part, a cast aluminum upper plate 1 with a hard neoprene rubber V-notched plate 2 carried thereon with the V-notch facing downward and fixed to the bottom surface of the upper plate 1. This is the upper section of the cable clamp.

A heavier aluminum cast plate 4 has a similar hard neoprene rubber V-notched plate 3 molded to its top surface with the V-notch facing upward. This is the bottom section of the cable clamp.

The upper clamping section comprising plates 1 and 2 is drawn down tightly over the cable 18 and to the bottom clamping section plates 3 and 4 by means of two "Wing-ended" threaded tightening bolts 5. These threaded bolts 5 have clearance through the upper cast aluminum plate 1, but are threaded into and can continue on through the bottom cast aluminum plate 4.

By tightening the "Wing-ended" bolts 5 over the cable 18, the cable 18 is firmly locked between the upper and lower clamping sections comprising respective plates 1, 2, 3, and 4. The cable 18 will not twist or otherwise move once the clamping section plates 1, 2, 3 and 4 are firmly tightened.

Optionally, the "Wing-ended" bolts 5 can be substituted with "Eye-ended" tightening bolts having a one inch "eye" configuration instead of the "wing". (Some utility men like to place a screw-driver through the eye bolt to facilitate tightening).

The bottom cast aluminum plate 4 is also the base of the tripod section. Three pairs of tripod leg supports or brackets 6, 6, 6 are attached to the bottom side of the bottom plate 4. The leg support or bracket pairs 6, 6, 6 are molded to the bottom plate 4 at the time of casting. Three extended rectangular cross-section outer aluminum tripod legs 10, 10, 10 are each secured in respective leg bracket pairs 6, 6, 6 by means of a Clevis pin 7, washer 8, and a cotter pin, allowing the leg 10 to swing about an axis 9 of the Clevis pin 7. The outer legs 10, 10, 10 are buffered with nylon washers (not shown) at the leg bracket pairs 6, 6, 6, preventing the outer legs 10, 10, 10 from swinging too freely. The respective planes of movement of the three outer legs 10, 10, 10 are disposed 120 degrees from each other. The legs 10, 10, 10 are disposed at a uniform distance from a common vertical axis (not shown). The tripod outer legs 10, 10, 10 are able to swing completely together or are folded outward to any angle, even to a plane extending through the bracket pairs 6, 6, 6. Rectangular cross-section aluminum inner tripod legs 13, 13, 13 are disposed in respective outer legs 10, 10, 10. Thus, each inner leg 13 may be extended fully to a maximum height or closed fully to a minimum height, approaching the length of the outer legs 10, 10, 10. The leg construction is identical for all three inner legs 13, 13, 13 and all three outer legs 10, 10, 10.

A buffer cap 12 is located on the bottom of each outer tripod leg 10, 10, 10 to provide cleaning on the inner leg 13, 13, 13 surface when telescoping occurs. The buffer caps 12, 12, 12 may be manufactured to provide a smoother action with less metallic scraping when extending or retracting the inner tripod legs 13, 13, 13. Each outer tripod leg 10 has four height positioning holes 11, 11, 11, 11 along two opposed sides. Each inner leg 13 has, on one end and on one side, a spring-loaded position/release button 14 that will snap into one of the height position holes 11, 11, 11, 11, selected by the user. The release button 14, when depressed, allows the inner leg 13 freedom of axial movement with respect to the outer leg 10. Each assembly of outer and inner tripod legs 10 and 13 is normally installed with the height position holes 11, 11, 11, 11 and the release button 14 facing the geometric axis (not shown) of the cable vise. The assembly of outer and inner tripod legs 10 and 13 is shown installed facing outwards in the drawing to better illustrate this construction. The inner tripod leg 13 may be completely removed from the outer leg 10 for cleaning purposes. The bottom end of each inner tripod leg 13 carries a three piece assembly consisting of a small aluminum block 15, a threaded pointed bolt 16, and a neoprene rubber glide 17. The block 15 is located and locked in the inside bottom end of the inner leg 13. The bolt 16 is threaded and locked into the aluminum block 15 inside the inner leg 13, with the pointed end of the bolt 16 protruding downwards through the neoprene rubber glide 17. The neoprene rubber glide 17 has a metal insert which can be screwed down on the bolt 16 to cover the pointed end, thus preventing bodily injury or damage to other objects. The majority of uses of the cable vise will be on soil where the point must be exposed to provide a positive grip into the earth to prevent slippage of the legs 10 and 13 on the ground.

While the preferred embodiment of the invention has been illustrated and described, it will be understood that changes or modification may be made without departing from the spirit and scope of the invention as described herein.

Having described my invention, I claim:
1. A workholding vise, which comprises:
a generally planar elongated bottom plate;
a generally planar elongated top plate;
at least three legs, each having at least two coaxial telescoping sections and including means for fixing the telescoping sections thereof in mutually fixed relationship;
means for mounting said legs onto said generally planar elongated bottom plate at substantially equal distances from a common geometric axis of said means for mounting, said means for mounting allowing pivotal motion with respect to said generally planar elongated bottom plate;

a first elongated jaw mounted on said generally planar elongated bottom plate, said first elongated jaw including an elongated V-shaped open trough extending in the general direction of the elongation of said generally planar elongated bottom plate and said first elongated jaw;

a second elongated jaw mounted on said generally planar elongated top plate, said second elongated jaw including an elongated V-shaped open trough extending in the direction of elongation of said generally planar elongated top plate, the direction of elongation of said first and second elongated jaws being substantially parallel to the direction of elongation of said generally planar elongated top and bottom plates and said V-shaped troughs, said open V-shaped troughs in said first and second elongated jaws being disposed in generally registered relationship for cooperation with an associated cable;

said first and second elongated jaws having face portions of said open V-shaped troughs thereof manufactured of a rubber; and means for clamping said first and second elongated jaws together.

2. The apparatus as described in claim 1, wherein: said means for clamping comprises a plurality of threaded elements.

* * * * *